Figure 17:
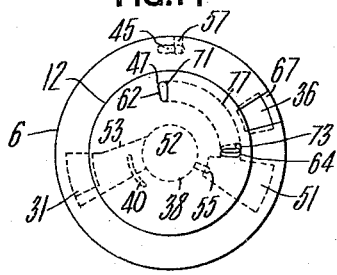
Figure 18:
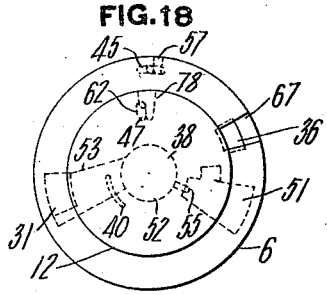
Figure 19:
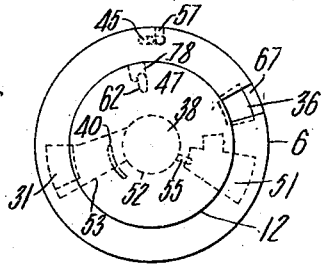

J. R. SNYDER.
ENGINEER'S VALVE.
APPLICATION FILED JUNE 10, 1914.
1,231,082.
Patented June 26, 1917.
3 SHEETS—SHEET 1.
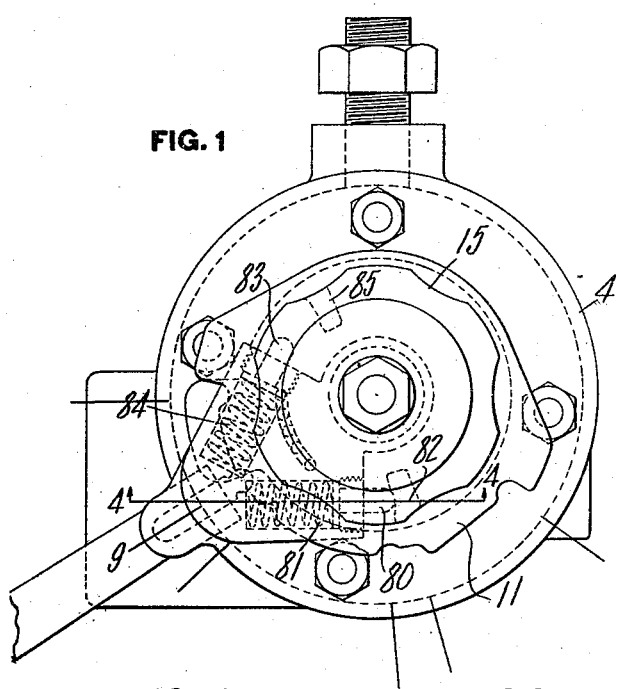
FIG. 1
FIG. 10   FIG. 20
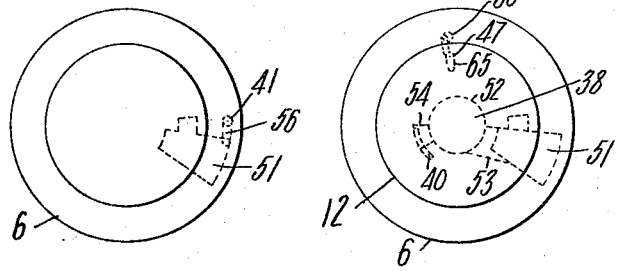
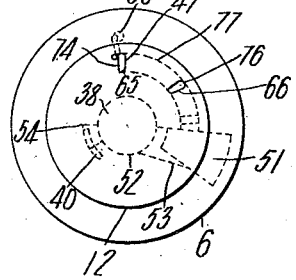
FIG. 21
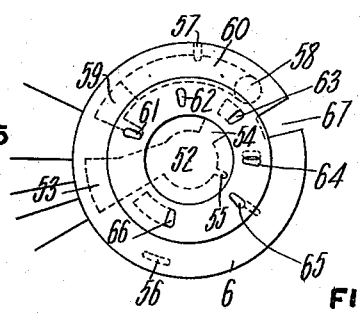
FIG. 5
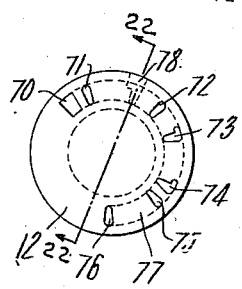
FIG. 6
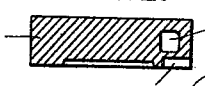
FIG. 22.
WITNESSES
W. T. Holman
Elbert L. Hyde
INVENTOR
Jacob Rush Snyder.
By Fredk W. Winter
Attorney J. R. SNYDER.
ENGINEER'S VALVE.
APPLICATION FILED JUNE 10, 1914.
1,231,082.
Patented June 26, 1917.
3 SHEETS—SHEET 2.
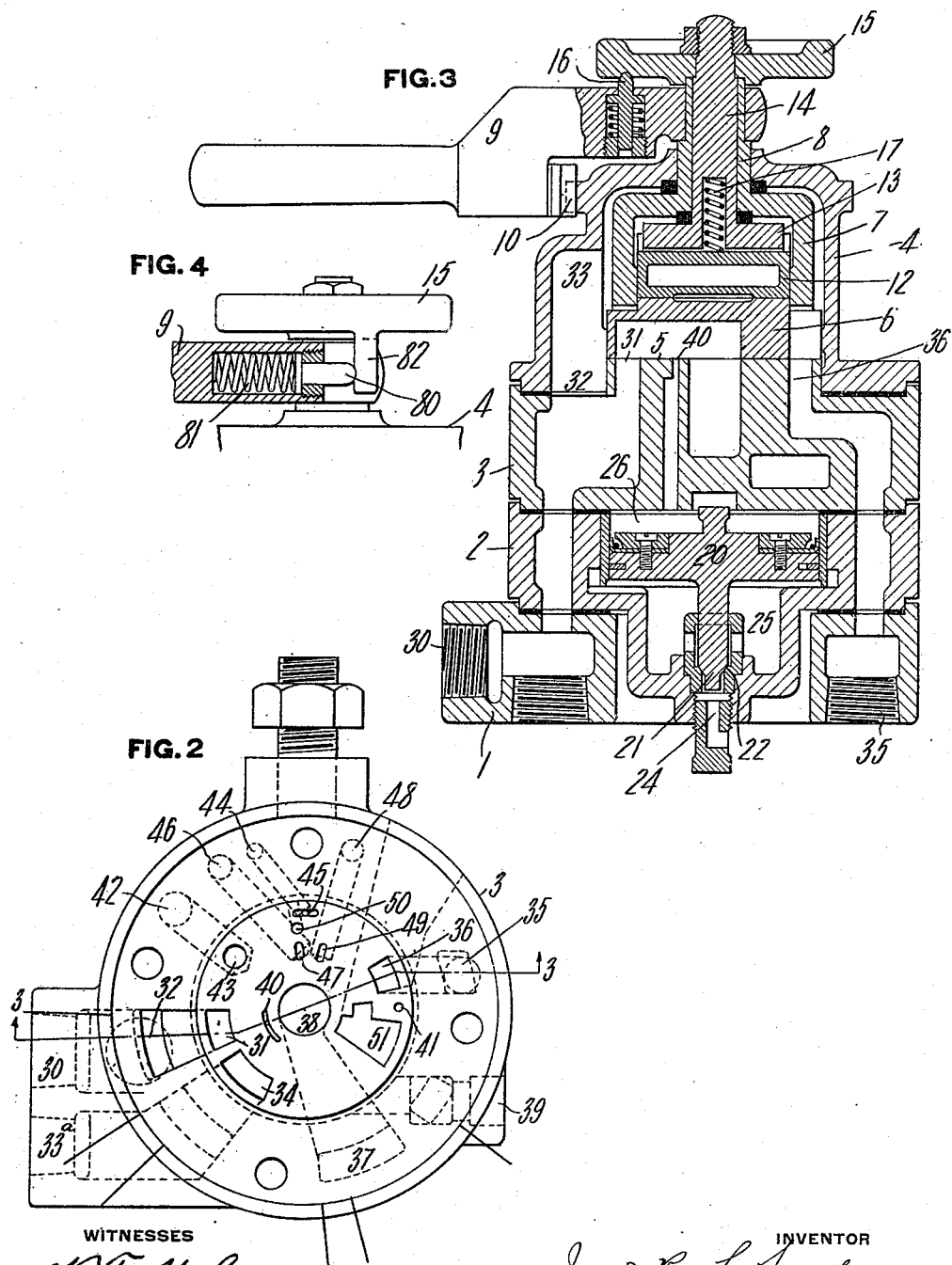

J. R. SNYDER.
ENGINEER'S VALVE.
APPLICATION FILED JUNE 10, 1914.

1,231,082.

Patented June 26, 1917.
3 SHEETS—SHEET 3.

WITNESSES

INVENTOR

UNITED STATES PATENT OFFICE.

JACOB RUSH SNYDER, OF PITTSBURGH, PENNSYLVANIA, ASSIGNOR TO PITTSBURGH AIR-BRAKE COMPANY, OF PITTSBURGH, PENNSYLVANIA, A CORPORATION OF PENNSYLVANIA.

ENGINEER'S VALVE.

1,231,082.  Specification of Letters Patent.  Patented June 26, 1917.

Application filed June 10, 1914. Serial No. 844,277.

*To all whom it may concern:*

Be it known that I, JACOB RUSH SNYDER, a resident of Pittsburgh, in the county of Allegheny and State of Pennsylvania, have invented a new and useful Improvement in Engineers' Valves, of which the following is a specification.

This invention relates to engineers' brake valves for air brake systems.

The object of the invention is to provide a brake valve wherein both the automatic valve and what is known as the independent valve are included in a single casing, so as to dispense with one set of pipe connections, and which is in compact form and has the operating means conveniently located and so arranged that both the automatic and the independent valve can be readily yet safely operated.

In the accompanying drawings Figure 1 is a plan view of the improved valve; Fig. 2 is a plan view of the valve seat, the upper part of the valve being removed; Fig. 3 is a vertical section on the line 3—3, Fig. 2; Fig. 4 is a detail section on the line 4—4, Fig. 1; Fig. 5 is a plan view of the main rotary valve; Fig. 6 is a similar view of the supplementary or independent valve, and Figs. 7 to 21 are diagrammatic views illustrating the various active positions of the valves. Fig. 22 is a cross section of the supplementary valve on the line 22—22 of Fig. 6.

The valve is adapted to any suitable modern air brake system in which provision is made for controlling the engine and tender brakes independently of the train brakes, and in which there is in the engineer's cab a second valve, known as the independent brake valve, in addition to the usual automatic brake valve. In the drawings the valve is shown of the general type of the standard Westinghouse automatic engineer's valve, and embodies in the same casing a second valve which takes the place and performs the function of the usual independent brake valve found in Westinghouse systems. The port connections are particularly designed for a system such as shown in my Patent No. 1,102,099, dated June 30, 1914, but the valve can be readily adapted to any air brake system.

The valve casing comprises a plurality of sections built up in the manner of the Westinghouse engineer's brake valve, to-wit, a base section 1 to which the several pipes are connected, an intermediate section 2 in which the equalizing vent valve is mounted, a third section 3 whose top surface forms the valve seat, and an upper or cap section 4, these several sections being secured together in the usual or any preferred way. On the valve seat 5 is mounted the main rotary valve 6, as is usual, and which is engaged by a yoke 7 of the hollow rotary stem 8 which extends through the top of the cap 4, and to which is connected the usual automatic brake handle 9, the latter being provided with a spring pressed dog 10 for engaging notches in the segment 11, as is usual, to indicate the different positions of the valve. The supplementary or independent valve is shown as a disk 12 rotatable on a seat formed by the upper face of the main valve 6, and the supplementary valve is engaged by a rotating member 13 on the lower end of a stem 14 which extends through the hollow stem 8 of the main valve and at its upper end is provided with a suitable rotating means, shown as a small hand wheel 15, but which obviously may be of any other preferred form. A spring pressed plunger 16 is carried by the automatic handle 9 and is adapted to engage in one of five different depressions in the lower face of the hand wheel 15 to indicate the several positions of said independent valve. A spring 17 is mounted in the stem 14 and holds both valves to their seat.

The service or equalizing vent valve is of the usual form, comprising a piston 20 mounted in a chamber in the section 2 of the valve casing, and having the lower end of its stem formed as a valve 21 coöperating with the seat 22 and thereby controlling the exhaust port 24. The chamber 25 below the piston 20 is normally open to the train pipe, and the chamber 26 above said piston is normally open to the equalizing reservoir, all as is usual.

The main reservoir has two connections to the valve, as usual, to-wit, a direct connection at 30, from which leads a passage connecting to port 31 in the main valve seat, and to port 32 to the chamber 33 above the rotary valves; and an indirect connection by way of the feed valve at 33ª from which a passage connects to a port 34 in the main valve seat. The train pipe also has two connections to the valve,—one at 35, from which a passage leads to a port 36 in the main valve seat, and the other at 37, from which a passage leads to the port 38 arranged centrally in the main valve seat. The equalizing reservoir is connected at 39, from which a connection extends to the chamber 26 above the piston 20, as usual. From this chamber two passages extend up to the main valve seat, one opening through port 40 located adjacent the central train pipe port 38, and the other opening through port 41 near the periphery of the main valve seat. At 42 is connected a valve whose main function is to maintain train pipe pressure against leakage, but having other functions, and which will be termed a pressure maintenance valve. From the connection 42 a passage leads to port 43 in the main valve seat. The pump governor is connected at 44 and from this a passage extends to port 45 in the main valve seat. The application valve for the engine brake cylinders (or the engine brake cylinders directly) has two connections to the valve, one a direct connection at 46 from which a passage leads to port 47 in the main valve seat, and the other an indirect connection by way of a distributing valve, this connection being made at 48 and communicating by a passage to port 49 in the main valve seat. A small port 50 adjacent to the pump governor port 45 is connected by a passage opening through the side face of the valve seat into the chamber 33, and as the latter is constantly in communication with the main reservoir, the port 50 may be termed an additional main reservoir port. 51 is the exhaust port.

The main rotary valve 6 is provided on its under face with the following cavities, to-wit:—a large cavity 52 occupying the central portion of the disk and extending nearly to the periphery of the valve on one side, and on its opposite side having two smaller extensions 54 and 55 respectively; a small arc-shaped cavity 56 near the periphery of the valve; a small radially arranged cavity 57 extending inwardly from the periphery of the valve, substantially diametrically opposite the cavity 56, and a pair of cavities 58 and 59 also located relatively near the periphery of the valve and connected by the cored-out passage 60 which extends above the radial cavity 57 but does not intercept the latter. The cavity 59 furthermore connects with a port 61 in that portion of the upper face of the valve which forms a seat for the supplementary valve 12. Five other ports, numbered respectively 62, 63, 64, 65 and 66 extend through the valve and open in that portion of the upper face of the main valve which forms the seat for the supplementary valve. At one side the main valve is also provided with a relatively large cut-away portion or notch 67, which extends some distance radially inwardly, and is cut away for the full thickness of said valve.

The supplementary valve 12 is provided in its lower face with a series of ports all located at equal distances from the center of said valve, and which are numbered respectively 70, 71, 72, 73, 74, 75 and 76, and all of which are connected together by the cored-out passage 77. It is also provided with a radially arranged cavity 78 opening on the side face of the valve, and therefore communicating with the main reservoir space 33 and located in a plane below the cored-out passage 77, and therefore not communicating with the latter.

The main valve has six positions, indicated by the positional lines on Figs. 1 and 2, and which in order contraclockwise are "release," "running," "holding," "lap," "service," and "emergency" positions. The supplementary valve has five different positions, indicated by the positional lines on Fig. 5 and which in order contra-clockwise are "release," "running," "lap," "service" and "emergency" positions. By manipulating the automatic handle the main valve can be set to each of the positions indicated, and in those several positions effects the automatic control of the train as well as the engine brakes in the same manner as automatic engineers' brake valves of the usual type. The supplementary or independent valve can be moved to either of its active positions on the main valve, in whichever position the main valve may be set, and when so moved will effect the independent control of the engine and tender brakes incident to the respective positions of the said supplementary valve. A number of possible combinations of the two valves are not active positions, and therefore, in the drawings only their active positions have been shown, and in order to avoid confusion on account of the multiplicity of ports, in the diagrammatic views only those ports are illustrated which are active in the particular position being shown. Inasmuch as running position is the normal position of both valves this will be first described.

I. When the main handle is in running position (shown in Figs. 7, 8 and 9) the feed valve port 34 is connected by the cavity 52, to the train pipe port 38 and also to the equalizing reservoir port 40. The main reservoir port 31 is connected by cavity 59, passage 60 and cavity 58 to the pump governor port 45.

Figure 7:
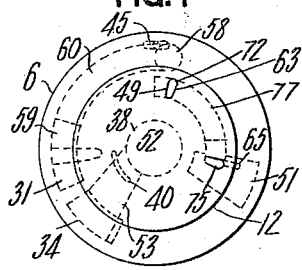

When the independent valve is also in running position the condition is as shown in Fig. 7, with the port 49 leading to the engine cylinder or the application valve therefor, via the distributing valve, communicating with port 63 through the main valve and this in turn communicating with port 72 in the independent valve, and thence through passage 77 to port 75 which is in communication with port 65 through the main valve, the latter being in communication with exhaust port 51.

Figure 8:
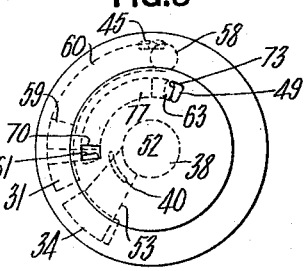

With the independent valve in service position the condition is as shown in Fig. 8, with the main reservoir port 31 communicating with the cavity 59 in the main valve, thence through port 61 in the top face of the main valve, port 70 in the independent valve, via passage 77, port 73, port 63 through the main valve, to distributing valve port 49, thereby admitting pressure to the distributing valve (or directly to the engine brake cylinders) and setting the brakes on the locomotive to the degree of admission of pressure to the application valves but without in any manner affecting the train brakes. Ports 49 and 63 only partly overlap, thereby giving only a slow flow of air to the engine brake cylinder valve.

Figure 9:
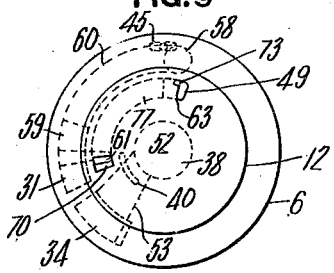
Figure 14:
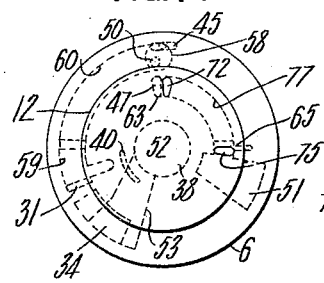
Figure 15:
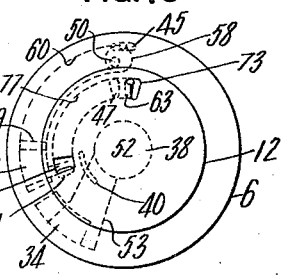
Figure 16:
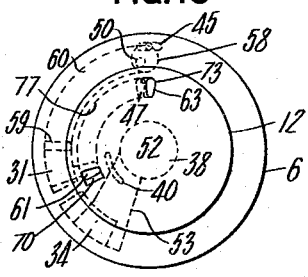

When the independent valve is in emergency position the condition is as shown in Fig. 9, with the main reservoir port 31 still connected to the engine application port 49, but now the ports 63 and 49 register fully so as to get a rapid flow instead of the gradual flow which occurred in service application position.

In all other positions of the independent valve, when the main handle is in running position, the ports are blanked.

II. When the main handle is in service position (shown in Fig. 10) the equalizing reservoir port 41 in the main valve seat is connected by the cavity 56 in the main valve to the exhaust port 51, and hence, the equalizing reservoir is slowly drained to secure movement of the equalizing valve piston 20 to reduce train pipe pressure, as usual, for setting the brakes automatically with service application. In this position of the main handle the independent valve is not intended to be operated at all, for the reason that the main handle usually remains in service position only a very short time, being moved back to lap position as soon as the desired reduction in equalizing reservoir pressure is attained.

III. With the main handle in lap position (shown in Figs. 11, 12 and 13), the feed valve port 34 in the main valve seat is covered by the cavity 59 in the main rotary valve and thence through passage 60 to port 58 in the rotary valve, and communicates with the pressure maintenance valve port 43 so that at all times main reservoir air by way of feed valve is admitted to the pressure maintenance valve so that in case of a train pipe leakage same will be automatically replenished.

Figure 11:
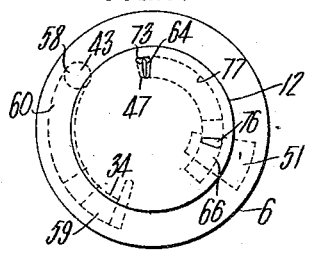

When the independent valve is in release position, with the main handle in lap position, the condition is as shown in Fig. 11, with the engine application valve port 47 in the main valve seat communicating with the port 64 through the main valve and this in turn communicating with the port 73 in the independent valve and thence by passage 77 to the port 76, thence to port 66 through the main valve to exhaust port 51, thereby venting the application chamber on the engine valve (or the brake cylinder directly) and securing the release of the brakes.

Figure 12:
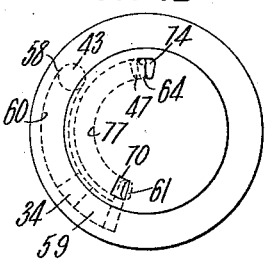

When the independent valve is in service position, as shown in Fig. 12, the feed valve port 34 communicates with cavity 59 in the main valve, thence through port 61 in the top face of the main valve, to port 70 in the independent valve, through passage 77 therein, to port 74, thence to port 64 through the main valve directly to the engine application valve through port 47, with a gradual flow, so as to get a gradual application of the engine brakes.

Figure 13:
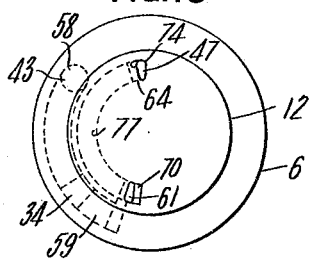

With the independent valve in emergency position, as shown by Fig. 13, this same communication is established except that the ports 64 and 47 register fully so as to get a rapid flow of air to the engine application valve and a sudden setting of the engine brakes.

In running and lap positions of the independent valve, when the main handle is in lap position, all special ports are blanked.

IV. When the main valve is in holding position, (shown in Figs. 14, 15 and 16), it connects the feed valve port 34 through the cavity 52 with the train pipe port 38 and also with the equalizing reservoir port 40, while the main reservoir port 31 is overlapped by the cavity 59, and through passage 60 and port 58 connects to the pump governor port 45, and also to the main reservoir port 50. This maintains the train pipe and equalizing reservoir pressures.

While the main handle is in holding position and the independent valve in running position, (shown in Fig. 14), the engine application valve port 47 registers with port 63 in the main valve, and the latter registers with port 72 in the supplementary valve, so that communication is established through passage 77 with port 75 in the supplementary valve, thence to port 65 in the main valve, and as the latter registers with the exhaust port 51, the application chamber on the locomotive valve is vented to the atmosphere.

When the independent valve is moved to service position (shown in Fig. 15), the main reservoir port 31 is over-lapped by the cavity 59 in the main valve and thus connects through port 61 with port 70 in the independent valve, and this through passage 77 and port 73 establishes communication with port 63 in the main valve to the engine application valve port 47, but through a restricted opening so that a gradual flow only to the application valve is brought about to produce a service application of the engine brakes.

When the independent valve is moved to emergency position the last named connections are maintained, but the ports 73 and 63 now register fully so that a rapid flow of air to the application valve is secured to bring about an emergency application of the engine brakes.

In the other positions of the independent valve the active ports are all blanked.

V. When the main handle is in release position, it establishes the communication shown in Figs. 17, 18 and 19. The main reservoir port 31 is connected to the train pipe port 38 and to the equalizing reservoir port 40 through the cavity 52, the main reservoir chamber 33 in the upper part of the valve casing is connected to train pipe port 36 through the notch 67, and the radial cavity 57 in the main valve connects the main reservoir chamber 33 with the pump governor port 45. Train pipe port 38 is connected to the exhaust port 51 through the extension 55 of the large cavity 52 in the main valve, thereby acting as a warning to the engineer and preventing him from leaving the valve too long in release position.

The charging up of the train pipe by bringing the main valve to release position releases the brakes automatically throughout the train. If the independent valve is in running position no further effect is produced, because all its ports are blanked, as they also are when the independent valve is in lap position. If the independent valve is brought to release position it connects the application chamber port 47 through port 62 in the main valves and port 71 in the independent valve, passage 77, port 73 and port 64 in the main valve with the exhaust port 51, thereby exhausting the application chamber of the triple valve on the engine, and releasing the engine brakes.

If while the main handle is in release position the independent valve be moved to service position it connects the main reservoir chamber 33 through the radial recess 78 with port 62 through the main valve which is in registration with application valve port 47 in the main valve seat, but only through a restricted opening, thus allowing only for a gradual flow of air to the engine brake cylinders.

If now the independent valve is moved to emergency position the connections just described are maintained, but a larger communication is established by cavity 78 with port 62, thereby producing a more rapid flow of air to the application chamber of the engine valve and securing an emergency application of the brakes.

VI. When the main handle is in emergency position it produces the condition shown in Fig. 20. The cavity 52 in the main valve connects train pipe port 38 and equalizing reservoir port 40 with exhaust port 51, thereby rapidly exhausting both the equalizing reservoir and train pipe and bringing about an emergency application of the brakes. At the same time main reservoir port 50 is connected through port 65 with the engine application port 47, giving a gradual flow of air to the application chamber of the engine valve to assist in applying the engine brakes.

If when the main handle is in emergency position the independent valve be brought to release position it produces the condition shown in Fig. 21, in which the engine application port 47 is connected through port 65 in the main valve with port 74 in the independent valve, and thence through passage 77 to port 76 which is in register with port 66 through the main valve, and as the latter registers with exhaust port 51 this releases the brakes on the engine while still maintaining the emergency position as to the train brakes. Air is still flowing to the engine application port 47 but as it flows less slowly than it is being exhausted no effect is produced.

To prevent the independent valve remaining in emergency position longer than desired, I provide suitable returning means, which is shown as a plunger 80 mounted in the main handle 9 and constantly pressed outwardly by spring 81 and having its projecting end arranged to be contacted by a lug 82 on the lower face of the actuating hand wheel 15 of the independent valve as the latter is moved from service to emergency position, thereby putting the spring 81 under compression, so that as soon as the hand wheel is released said spring pushes the independent valve back to service position.

On the opposite side of the handle is another plunger 83 also pressed outwardly by spring 84 and having its end arranged to be contacted by lug 85 on the lower face of the actuating hand wheel 15, these parts being arranged to put the spring under compression in moving the independent valve from running to release position, and therefore act as a means for preventing the engineer from accidentally moving the independent valve to release position, and also for returning the valve from release to running position when the hand wheel is released.

The valve described is compact, and contains in one casing both the automatic brake valve and the independent brake valve, and these valves are so related that by actuating the one or the other, or both, the same effect can be produced as with entirely separate automatic and independent valves. The operating means for the independent valve are however, more accessible to the engineer than with the arrangement in which two valves are employed. Furthermore, only one set of piping is necessary, all the pipes connecting to the base of the valve.

What I claim is:—

1. In an engineer's brake valve, a valve seat provided with ports, a main valve member coöperating with said seat and provided with cavities and ports and controlling the ports in the valve seat, and an independent valve member coöperating with the main valve member and controlling the ports therein.

2. In an engineer's brake valve, a valve seat provided with ports, a main valve coöperating with said seat and provided with cavities and ports and controlling the ports in the valve seat, an independent valve member coöperating with the main valve member and controlling the ports therein, a hollow actuating stem for the main valve, and an actuating stem for the independent valve extending through said hollow stem.

3. In an engineer's brake valve, a valve seat provided with ports, a main valve coöperating with said seat and provided with cavities and ports and controlling the ports in the valve seat, an independent valve member coöperating with the main valve member and controlling the ports therein, an actuating means for each valve, and a spring indicator mounted on the operating means of one of said valves and arranged to engage notches in the actuating means of the other valve.

4. In an engineer's brake valve, a valve seat provided with ports, a main valve coöperating with said seat and provided with cavities and ports and controlling the ports in the valve seat, an independent valve member coöperating with the main valve member and controlling the ports therein, and spring means for resisting the movement of the independent valve at the limits of its movements in both directions.

5. In an engineer's brake valve, a valve seat provided with ports, a main valve coöperating with said seat and provided with cavities and ports and controlling the ports in the valve seat, an independent valve member coöperating with the main valve member and controlling the ports therein, and spring means arranged to return the independent valve from emergency to service position.

6. In an engineer's brake valve, a valve seat provided with ports, a main valve coöperating with said seat and provided with cavities and ports and controlling the ports in the valve seat, an independent valve member coöperating with the main valve member and controlling the ports therein, and spring means arranged to return the independent valve from release to running position.

7. In an engineer's brake valve, the combination of a valve seat provided with ports, a main valve coöperating with said seat and controlling said ports and arranged to effect the automatic control of the train brakes, said main valve being provided with ports arranged in several positions of the main valve to connect with ports in the valve seat, and a supplementary valve coöperating with the main valve and controlling the ports therethrough and arranged in several positions of the main valve to effect the independent control of the engine brakes.

8. In an engineer's brake valve, the combination of a valve seat provided with ports connecting to the main reservoir, the train pipe, the equalizing reservoir, the atmosphere and the engine brakes, a main valve coöperating with said seat and provided with cavities arranged in different positions of the main valve to establish different connections between the main reservoir, the train pipe, the equalizing reservoir and the atmosphere to effect the automatic control of the train brakes, and provided with other ports arranged in different positions of said main valve to connect with the main reservoir, the atmosphere, and the engine brakes, and a supplementary valve coöperating with said main valve and controlling the ports therethrough, and arranged in one position thereof to connect the main reservoir port with the engine brake application port to apply the engine brakes, in another position thereof to connect the engine brake application port with the atmosphere to release the engine brakes, and in other positions to blank said ports.

9. In an engineer's brake valve, the combination of a valve seat provided with ports connecting to the main reservoir, the train pipe, the equalizing reservoir, a train pipe pressure maintenance valve, the atmosphere and the engine brakes, a main valve coöperating with said seat and provided with cavities arranged in different positions of the main valve to establish different connections between the main reservoir, the train pipe, the train pipe pressure maintenance valve, the equalizing reservoir and the atmosphere to effect the automatic control of the train brakes, and provided with other ports arranged in different positions of said main valve to connect with the main reservoir, the atmosphere, and the engine brakes, and a supplementary valve coöperating with said main valve and controlling the ports therethrough, and arranged in one position thereof to connect the main reservoir port with the engine brake application port to apply the engine brakes, in another position thereof to connect the engine brake application port with the atmosphere to release the engine brakes, and in other positions to blank said ports.

10. In an engineer's brake valve, the combination of a valve seat provided with ports, a main valve coöperating with said seat and controlling said ports and arranged to effect the automatic control of the train brakes, said main valve being provided with ports therethrough arranged in all positions of the main valve to connect with ports in the valve seat and a supplementary valve coöperating with the main valve and controlling the ports therethrough and arranged in all positions of the main valve to effect the independent control of the engine brakes.

11. In an engineer's brake valve, the combination of a valve seat provided with ports connecting to the main reservoir, the train pipe, the equalizing reservoir, the atmosphere and the engine brakes, a main valve coöperating with said seat and provided with cavities in different positions in the main reservoir to establish different connections between the main reservoir, the train pipe, the equalizing reservoir, and the atmosphere, to effect the automatic control of the train brakes, and provided with other ports arranged in different positions of said main valve to connect with the main reservoir, the atmosphere, and the engine brakes, said ports opening through the top face of said valve, and a supplementary valve coöperating with the upper face of said main valve and controlling the ports therethrough, and arranged in one position thereof to connect the main reservoir port with the engine brake cylinder ports to apply the engine brakes, in another position thereof to connect the engine brake cylinder port with the atmosphere to release the brakes, and in other positions to blank said ports.

In testimony whereof, I have hereunto set my hand.

JACOB RUSH SNYDER.

Witnesses:
ELBERT L. HYDE,
GLENN H. LERESCHE.

Copies of this patent may be obtained for five cents each, by addressing the "Commissioner of Patents, Washington, D. C."